United States Patent
Hicks (10) Patent No.: US 10,523,855 B2
(45) Date of Patent: Dec. 31, 2019

(54) INFRARED AND VISIBLE LIGHT DUAL SENSOR IMAGING SYSTEM

(71) Applicant: INTEL CORPORATION, Santa Clara, CA (US)

(72) Inventor: Richmond Hicks, Aloha, OR (US)

(73) Assignee: INTEL CORPORATION, Santa Clara, CA (US)

( * ) Notice: Subject to any disclaimer, the term of this patent is extended or adjusted under 35 U.S.C. 154(b) by 948 days.

(21) Appl. No.: 14/864,717

(22) Filed: Sep. 24, 2015

(65) Prior Publication Data

US 2017/0094141 A1    Mar. 30, 2017

(51) Int. Cl.
*H04N 5/225* (2006.01)
*H04N 5/33* (2006.01)
*H04N 9/07* (2006.01)

(52) U.S. Cl.
CPC ............. *H04N 5/2258* (2013.01); *H04N 5/33* (2013.01); *H04N 9/07* (2013.01)

(58) Field of Classification Search
CPC ........... H04N 5/2258; H04N 5/33; H04N 9/07
See application file for complete search history.

(56) References Cited

U.S. PATENT DOCUMENTS

| | | | |
|---|---|---|---|
| 2008/0212849 A1 | 9/2008 | Gao | |
| 2011/0128362 A1* | 6/2011 | Shi | G06K 9/00255 348/77 |
| 2011/0169911 A1* | 7/2011 | Gabura | G06T 11/001 348/32 |
| 2011/0228096 A1 | 9/2011 | Friel et al. | |
| 2012/0200734 A1 | 8/2012 | Tang | |
| 2014/0285672 A1 | 9/2014 | Hogasten et al. | |
| 2014/0320689 A1* | 10/2014 | Ohba | G06T 3/4038 348/222.1 |
| 2015/0109454 A1* | 4/2015 | Strandemar | H04N 5/332 348/164 |
| 2015/0125092 A1* | 5/2015 | Zhuo | G06T 5/002 382/275 |
| 2015/0189192 A1* | 7/2015 | Jonsson | G06T 5/50 348/164 |
| 2018/0146144 A1* | 5/2018 | Sugiyama | H04N 9/07 |

OTHER PUBLICATIONS

PCT Application No. PCT/US2016/044516, Notification Concerning Transmittal of International Preliminary Report on Patentability, dated Apr. 5, 2018, 7 pgs.
PCT International Search Report and Written Opinion of the International Searching Authority for International Application No. PCT/US2016/044516, dated Nov. 17, 2016, 15 pages.

* cited by examiner

*Primary Examiner* — Dramos Kalapodas
(74) *Attorney, Agent, or Firm* — Womble Bond Dickinson (US) LLP (57) ABSTRACT

A dual sensor imaging system is described for visible and infrared light. One example includes a first image sensor to detect the luminance of a scene, a second image sensor to detect the visible light chrominance of the scene and to detect an infrared image of the scene, and an image processor to receive the luminance from the first image sensor and the chrominance from the second sensor to generate a visible light image of the scene, the image processor to further receive the infrared image from the second image sensor and to extract the infrared image from the visible light chrominance of the scene.

19 Claims, 4 Drawing Sheets

INFRARED AND VISIBLE LIGHT DUAL SENSOR IMAGING SYSTEM

FIELD

The present disclosure relates to near infrared and visible light image and video capture and, in particular, to a dual sensor camera system and method.

BACKGROUND

The steady decline in size and cost for digital camera modules results in ever more uses and installations of camera modules. Notebook computers, tablets, smart phones, and even some desktop monitors include a microphone and a camera near the display for use with video conferencing. Some designs have multiple microphones to help with audio noise reduction. Some designs have multiple cameras to provide depth sensing, and other effects. The currently most common camera modules use a CMOS (Complementary Metal Oxide Semiconductor) sensor or photodetector array which is sensitive to all colors of visible light and also to near infrared (NIR) light. As a result any inexpensive camera module may be converted to an infrared camera by removing the color filters and replacing the NIR blocking filter with an appropriate NIR pass filter.

Notebook computers are now providing an NIR camera together with the primary video camera. The NIR camera is provided for face log in but may be used for any other function with the appropriate software. As an alternative, a single camera may be configured to incorporate both NIR and RGB (Red Green Blue) visible light sensitivity. This allows both functions to be performed with a single camera module, but the result is larger than the standard primary camera with worse optical performance and more noise.

For clamshell and notebook form factors, a thin display (reduced Z-height) allows for a lighter, easier to use, and more attractive device. For monitors and displays, OLED (Organic Light Emitting Diode) and advanced LCD (Liquid Crystal Display) technologies allow for even thinner desktop monitors. As these and portable devices compete for market share, two areas of competition are to reduce the thickness of the device and to reduce the width of the bezel. Thinner or flatter devices are perceived to be more stylish and in some cases fit more easily in slim pockets. Smaller bezels also allow more of the device to be used for the display which increases the ease in reading the display. In some cases, it allows a device with a small screen to be made even smaller for higher portability.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A high quality, high definition camera provides a real benefit in video conferencing and any other video or photography application. A larger camera sensor receives more light and so it works better with less noise when the light is low. On the other hand, the higher the quality, the higher the resolution, and the larger the sensor, the larger the resulting camera module. As displays become very thin, a camera module with a CMOS sensor and an imaging lens may be thicker than the display. A high quality camera may also require a large sensor and also a large aperture, autofocus lens system. Many otherwise thin smart phone devices have a camera hump on the back. By adding more cameras, the hump is made larger.

As described herein, a pair of cameras or sensors may be combined to serve two or more functions. This results in a smaller lower cost system than if one camera performed both RGB and IR tasks or if two cameras each performed a different task separately. By optimizing and combining the outputs of the two sensors for both tasks, the cost is lowered, the Z-height is reduced, and the performance is improved.

As described herein, the functions of a camera pair are configured to provide an aggregate performance both for RGB and for NIR usages. A first camera of the pair is a monochrome sensor that is configured to provide high luminance resolution with good sensitivity and low noise. A second camera of the pair is configured to provide lower resolution color and NIR data. A monochrome camera can be combined with a color camera to deliver twice the effective resolution of a similar single camera. The improved resolution is provided together with improvements in sensitivity and noise. As described herein, the dual camera system is optimized for both RGB and NIR usages.

As an example, one camera is optimized to deliver high resolution for the luminance portion of the RGB visible color applications while the second camera is optimized to deliver color and NIR data at a lower resolution. The combination provides a lower Z-height. This is because two 720P cameras are thinner than one 1080P camera. A similar rule applies to any resolution comparison. The combination provides lower cost because two 720P cameras cost less than two 1080P cameras or even a combination of a 1080P camera with a VGA (Video Graphics Adapter 480P) NIR camera. In addition, a monochrome sensor as described herein provides high signal quality even with smaller pixels. The combination also provides improved RGB performance compared to an RGB sensor. This is because a monochrome sensor has better sensitivity and dynamic range than a color sensor. The relatively lower resolution of the color information does not affect the perceived RGB image quality as the human eye is less sensitive to noise and resolution in the color space than in the luminance space.

In a conventional system, such as a video conferencing system in a notebook computer or desktop display, a primary high quality 1080P RGB video camera may be used for a videoconference. This camera is combined with a VGA resolution NIR stream for face recognition or other NIR uses. The VGA NIR camera uses the same field of view as the high quality camera. The first primary RGB sensor provides luminance information and chrominance information for the scene. The primary camera may be large, expensive, and thick. As 4K and higher resolutions are developed, the sensor and the necessary optical system become larger and more expensive.

When a single camera is used to produce both RGB and NIR images, there may be high color noise caused by the optical and electrical crosstalk. The crosstalk occurs because the color filters of the image sensor are not selective in the NIR spectrum. The red, green, and blue filters also pass NIR so the NIR content must be removed from each color channel. This cannot be accurately done because, the amount of NIR is different in each color channel and the NIR photons tend to pass through one photodetector into the next, blurring the distinctions. As a result, NIR extraction algorithms tend to add noise, which appears as different textures overlayed on the actual scene. A separate luminance sensor, which rejects all NIR light avoids this problem of subtracting the NIR.

For an RGB sensor, the sensor generates a brightness level for red, green, or blue light at each pixel or location on the sensor or at nearby locations. An equivalent way to characterize an image from the sensor is to measure the overall brightness, referred to as luminance, of a pixel and then combine that with the color of the pixel, referred to as chrominance, e.g. YCrCb. Human vision is particularly sensitive to luminance and to the brightness of the green part of a scene. The spectral response of the green channel matches human perception of luminance much more closely than the red or green channels, and so the green channel contains the majority of the luminance information from the camera. As described herein, the RGB/IR camera replaces some portion of the green pixels with NIR pixels. This effectively reduces the effective luminance resolution of the sensor, but the monochrome sensor more than compensates for this loss of information. Green helps to better distinguish skin tones and plants which are particularly relevant for a conferencing system.

Almost all camera image sensors use the Bayer or RGGB pixel pattern which optimizes the image sensor for a luminance chrominance system by using more green pixels than red or blue. A Bayer pattern of pixels is sometimes referred to as RGGB to indicate an extra green pixel for each red and blue pixel. The chrominance information requires that the relative brightness of the red, green, and blue all be available. In many video systems, RGB data is not transmitted, but luminance and chrominance, e.g. YCrCb, with the chrominance information transmitted at relatively lower resolution and higher compression. This allows images to be sent with less data. The loss of chrominance data is difficult for human vision to perceive.

Figure 1:
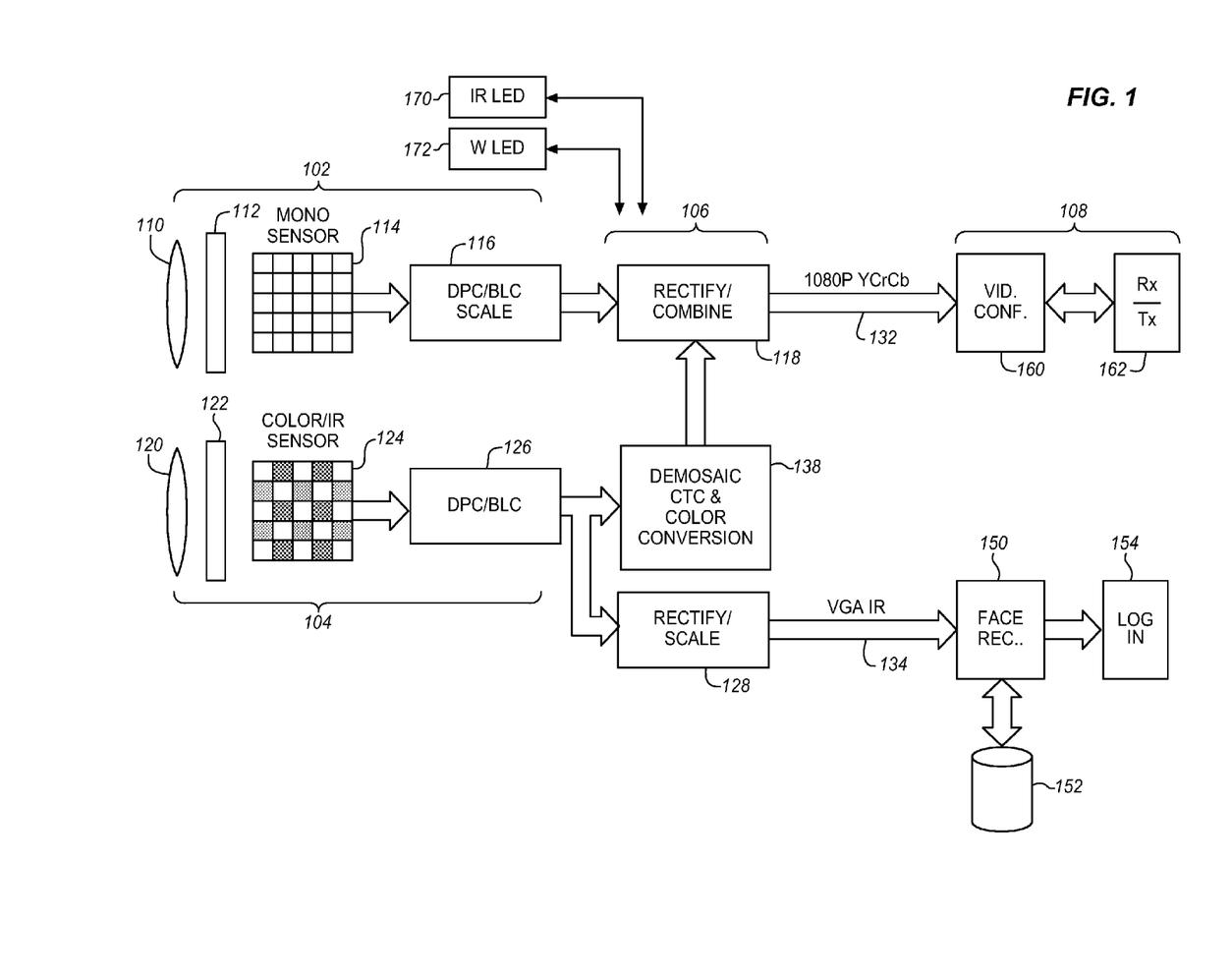
FIG. 1 is a block diagram of dual camera composite image system with IR imaging according to an embodiment.

FIG. 1 is a diagram of a sensor system that uses two cameras 102, 104. The first camera works with the second camera for high resolution video 132. The second camera works alone for low resolution NIR imaging 134. In this example, two 720P cameras together provide high resolution video with the same effective resolution as a single 1080P RGGB camera. 1080P has about two million pixels or about 2 MP and 720P has about 1 MP so that adding the pixels from two 720P sensors provides an approximation of the desired 2 MP of resolution. The resolution values can be scaled to suit any desired implementation. As an example, two 480P (VGA) cameras may be used to produce 720P video. Higher resolutions are also possible.

The first camera has an optical imaging lens 110 to capture and focus light from the scene. For a typical notebook computer video conferencing application, this lens is a simple fixed focus, fixed aperture lens. For other systems, the lens may be more complex and may be able to vary one or more of focus distance, aperture, and focal length. This light is filtered by an IR cut-off filter 112 and then passed to a monochrome sensor 114. The IR cut-off filter blocks light in the IR range for example, with wavelengths longer than 650 nm. The filter may also be set to allow only visible light (about 400-650 nm) or only some narrower range of light near green light (about 475-575 nm) to pass through to the sensor. The monochrome sensor is typically a standard CMOS photodetector array and receives all of the light in the visible band at each pixel. Accordingly, it only records luminance with no color information.

Figure 2:
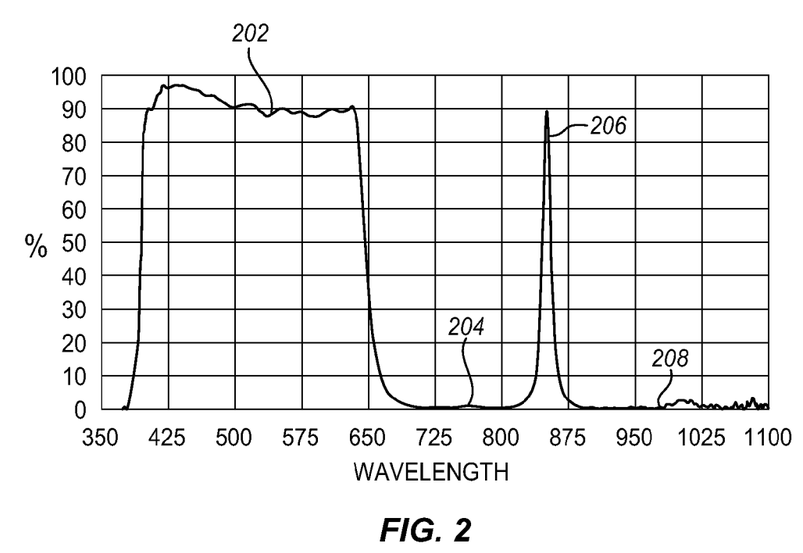
FIG. 2 is a graph of a filter transmittance characteristic for the color/IR sensor according to an embodiment.

The second camera 104 has a similar optical imaging lens 120 to capture and focus light from the same scene. The captured light is passed through an optical filter 122 that passes visible light of all visible colors and a particular, selected NIR band. FIG. 2 is an optical transmittance diagram for a suitable optical filter. The transmittance has a visible light peak 202 from about 375 nm to 650 nm. Light with a longer wavelength than 650 is cut off by a transmittance floor 204, 208. However, there is a narrow band transmittance peak matching the NIR illumination wavelength, as an example at about 850 nm, to allow a narrow NIR band to pass through. The narrow NIR passband 206 has a very low transmittance on either side 204, 208.

Figure 3:
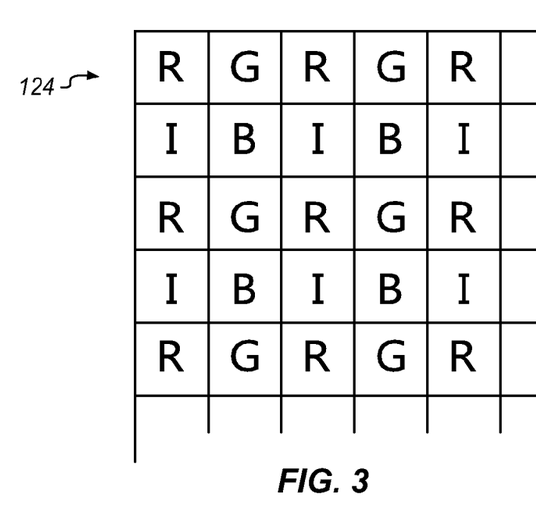
FIG. 3 is a diagram of a color filter layout for the color/IR sensor according to an embodiment.

The light that passes through the filter is captured by the camera sensor 124 that is configured to sense RGB and NIR (essentially black pixels). In some examples, the NIR light is that light needed for a face login application. Any desired NIR band may be selected. An example of the camera sensor filter structure is shown in FIG. 3. The sensor 124 in this example is very similar to a conventional Bayer pattern except that every other green pixel is replaced with a NIR pixel. Since a typical CMOS sensor array is sensitive to visible and NIR light, the sensor may be adapted simply by changing the filter array. In this example, because the main filter 122 allows some NIR to pass, the red, green, and blue pixels may have an additional NIR filter or coating to block NIR light from the color filters. Alternatively, the NIR values from the NIR pixels may be digitally subtracted from the red, green, and blue values during post processing in the image signal processor 106.

In FIG. 3, the first row has a color filter over each photodetector, photosite, or pixel. The first, third, fifth, and subsequent odd filters pass red light while the second, fourth, sixth, and subsequent even filters pass blue light to the corresponding photodetector. The second row has a similar alternating pattern with the odd filters passing NIR light and the even filters passing the blue light. In this array, there is an equal number of red, green, blue, and infrared pixels. The red, green and blue pixels provide rich chrominance information for the visible light spectrum. In a Bayer pattern the infrared filters would be green. The green pixel information would be combined to provide the luminance information. The specific pattern of FIG. 3 is provided as an example, there are many other variations. One variation is for the first row to be red and infrared and the second row to be blue and green. In a further variation, the second image sensor has more pixels but the infrared pixels still add up to a VGA resolution so that a larger percentage of the pixels are used for red, green, and blue.

In the RGB image sensor 124, the colored RGB and IR filters reduce the amount of light or number of photons falling on the photosite by eliminating all of the other colors. As a result, the number of electrons generated at the photosite is reduced. This reduces the signal to noise ratio (SNR) by reducing the signal amplitude. This is a problem with any color image sensor that relies on color filters to distinguish between the different colors in the scene.

However, the monochrome image sensor 114 of the first camera 102 does not require any color filters. As a result, the amount of light at each pixel is much greater and the signal will be much higher for a much better SNR. Configuring the imager on luminance reduces the spectral bandwidth of the optics allowing a sharper image given the same sources of chromatic aberration as compared to a sensor spanning both visible and NIR spectrums. For a typical YCrCb 1080P video using a Bayer pattern RGGB sensor, the majority of the luminance information comes from the green pixels which form about half of the pixels. In the example of FIG. 1, these pixels are delivered using the 720P monochrome sensor that has the same number of luminance sensing elements, i.e. green elements, as a 1080P RGGB sensor and therefore offers similar spatial, luminance resolution. The visible light chrominance values come from the RGB pixels of the color sensor 124.

As shown in FIG. 2, wavelengths between the visible and desired NIR spectrum are blocked out, reducing the interference from other sources of NIR illumination, such as sunlight. The dual cameras are tuned to meet the aggregate usage needs. The monochrome sensor is tuned to deliver luminance resolution equivalent to that of a 1080P RGGB sensor. The monochrome sensor delivers accurate, low noise, high dynamic range luminance information with very high detail. By using the full visible spectrum instead of only green pixels, a higher signal level is captured. The RGB NIR sensor is tuned to deliver 720P color information to combine with the luminance information and VGA IR information on demand.

Returning to FIG. 1, each camera 102 104 also includes image correction circuitry 116, 126. This circuitry may take a variety of different forms, depending on the nature of the image sensor and the optical system. In the present example, each image correction circuit includes Defective Pixel Correction (DPC), Black Level Correction (BLC), and scaling from the original resolution to the output resolution such as 720P to 1080P. The results from the image correction circuitry are two corrected images. The first is a monochrome image of the scene with high dynamic range. The second is a color image with equal amounts of red, green, blue, and infrared. In some embodiments, the image correction circuit 126 for the color sensor 124 may be configured to produce either a red, green, blue image or an infrared image at any time but not at the same time. This allows the two functions to be separated and may simplify processing. Alternatively, the infrared image may be isolated by an image signal processor (ISP) 106.

The image signal processor 106 or another processing resource may also be used to control illumination sources. In this example, the system includes a NIR LED (Light Emitting Diode) 170 to provide NIR illumination for NIR images, and a white LED 172 to provide white broad band illumination for visible light images. The LEDs may be operated together for composite color and IR images. The LEDs may be operated independently to provide only the type of light that is desired for the type of video or image. There may be more than one of each type of LED to provide a different field or direction of illumination or a different color of illumination. Other light sources may also be used such as Xenon flash, OLED, or other sources. The ISP may also adjust the brightness, number and duration of the LEDs to suit different ambient environments or applications.

The two images are passed to an image signal processor (ISP) 106. This processor may be a discrete processor dedicated to images, it may be a graphics processor with multiple functions, it may be a central processing unit (CPU) for general processing, or it may be a combination of these and other types of processors. In the example of FIG. 1, the ISP receives the color image and processes it to generate both an infrared image and a color image. For an infrared image, the received infrared pixels are rectified and scaled in an infrared processing module 128. This provides a VGA (480P) NIR image 134. This image may then be provided to a variety of different functions, such as face recognition, special imaging, or machine vision.

The system of FIG. 1 includes main processing 108 in the form of a CPU, SoC (System on a Chip), communications controller or other processing resource. The processing includes a face recognition module 150 attached to local face image storage 152. The face recognition module compares received NIR face images to the stored face images to determine whether the face is recognized. The results are passed to a log in module 154.

For producing a visible light image or video, the color sensor 124 pixels are processed in a color image processing module 138. In this module, the color pixels are converted from the Bayer pattern to an RGB pattern with a demosaic, and CTC (Cross Talk Compensation) and color conversion. The RGB pattern is thereby converted to a CrCb pattern. This also removes the infrared pixels. The resulting image data is then combined with the luminance data in a rectification/combination module 118.

To combine the luminance sensor 114 data with the color/IR sensor 124 data, the pixels must be correlated. Since the image sensors view the same scene from a different position, there is a disparity between where the same features of the scene are imaged on each sensor. The disparity changes with distance from the cameras due to parallax. As a result the parallax will be compensated with each image or frame of a video. In some embodiments, the parallax is determined once for a video frame and then adjusted periodically in the sequence of frames or when there is a change of scene. After the disparity between the images is determined, the luminance data may be combined with the appropriate color data to build a complete YCrCb image 132. The image or video sequence may be converted or rendered in any of a variety of different forms, such as any of the MPEG (Motion Picture Experts Group) or JPEG (Joint Photographic Experts Group) formats. The image or sequence of images may then be used by a video conferencing or other application.

The system of FIG. 1 includes main processing 108 coupled to receive the video stream. The processing 108 includes a video conference module 160 that is coupled to a communications module 162. The communication may be wired or wireless to connect the system to one or more other video conference nodes or to a recording or viewing station. The processing sends the frame sequence together with any associated microphone audio to other nodes and receives video and audio from other conference nodes for display on a local monitor and playback through local speakers. While the illustrated example suggests that the ISP 106 is a local resource, the system may send the image data as two separate streams, one from each sensor. The combining functions may then be performed at another conferencing node or by a conferencing server.

Figure 4:
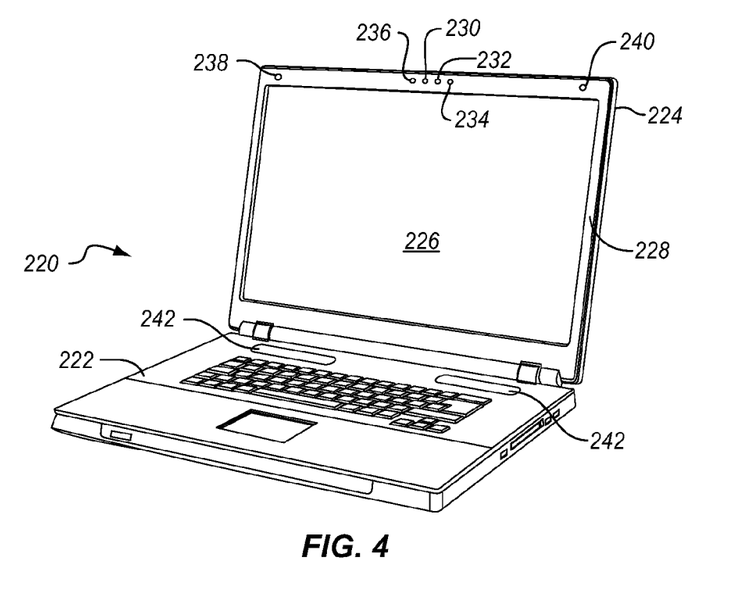
FIG. 4 is an isometric diagram of a video conferencing node according to an embodiment.

FIG. 4 is an isometric diagram of a portable device suitable for use with the two part composite camera system as described herein. This device is a notebook, convertible, or tablet computer 220 with attached keyboard. The device has a display section 224 with a display 226 and a bezel 228 surrounding the display. The display section is attached to a base 222 with a keyboard and speakers 242. The bezel is used as a location to mount a luminance or monochrome camera 230 and a color/NIR camera 232. The images detected by these two cameras may be separated or combined as described above. The bezel may also be used to house an NIR LED flash 234, a white flash or lamp 236 and one or more microphones 238, 240. In this example the microphones are separated apart to provide a spatial character to the received audio. More or fewer microphones may be used depending on the desired cost and audio performance. The ISP, graphics processor, CPU and other components are typically housed in the base 222 but may be housed in the display section, depending on the particular implementation.

This computer may be used as a conferencing device in which remote audio is played back through the speakers 242 and remote video is presented on the display 226. The computer receives local audio at the microphones 238, 240 and local video at the two composite cameras 230, 232. The white LED 236 may be used to illuminate the local user for the benefit of the remote viewer. The white LED may also be used as a flash for still imagery. The NIR LED 234 may be used to provide illumination for the NIR pixels of the color and NIR camera 232. In one usage example, the color and NIR camera and the NIR flash are used to photograph a user's face for face recognition. The recognized face may then be used as a log in.

Figure 5:
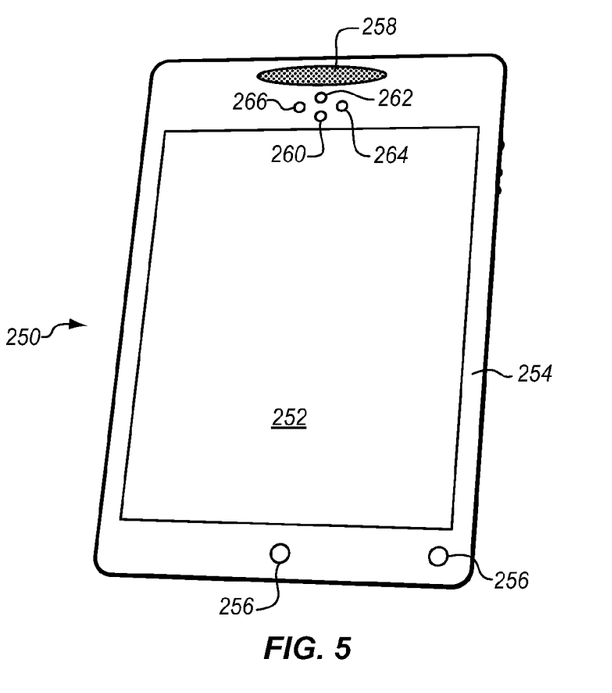
FIG. 5 is an isometric diagram of an alternative video conferencing node according to an embodiment.

FIG. 5 shows a similar device as a portable tablet or smart phone. A similar approach may be used for a desktop monitor or a wall display. The tablet or monitor 250 includes a display 252 and a bezel 254. The bezel is used to house the various audiovisual components of the device. In this example, the bottom part of the bezel below the display houses two microphones 256 and the top of the bezel above the display houses a speaker 258. This is a suitable configuration for a smart phone and may also be adapted for use with other types of devices. The bezel also houses two composite cameras 260, 262 stacked on over the other, an NIR LED 264 and white LED 266. The various processors and other components discussed above may be housed behind the display and bezel or in another connected component.

The particular placement and number of the components shown may be adapted to suit different usage models. More and fewer microphones, speakers, and LEDs may be used to suit different implementations. Additional components, such as proximity sensors, rangefinders, additional cameras, and other components may also be added to the bezel or to other locations, depending on the particular implementation.

In the example devices of FIGS. 4 and 5 fixed focus, fixed aperture camera modules 230, 232, 260, 262 may be used. For these devices the user is normally at about the same distance from the display. For other types of devices for which the user may be very close or very far from the camera variable or automatic focus camera modules may be used. For a fixed focus camera module, the NIR LED may be configured to provide a fixed amount of illumination based on the assumed distance of the user's face from the flash.

The video conferencing nodes of FIGS. 4 and 5 are provided as examples but different form factors such as a desktop workstation, a wall display, a conference room telephone, an all-in-one or convertible computer, and a set-top box form factor may be used, among others. The image sensors may be located in a separate housing from the display and may be disconnected from the display bezel, depending on the particular implementation. In some implementations, the display may not have a bezel. For such a display, the microphones, cameras, speakers, LEDs and other components may be mounted in other housing that may or may not be attached to the display.

In another embodiment, the cameras and microphones are mounted to a separate housing to provide a remote video device that receives both infrared and visible light images in a compact enclosure. Such a remote video device may be used for surveillance, monitoring, environmental studies and other applications. A communications interface may then transmit the captured infrared and visible light imagery to another location for recording and viewing.

Figure 6:
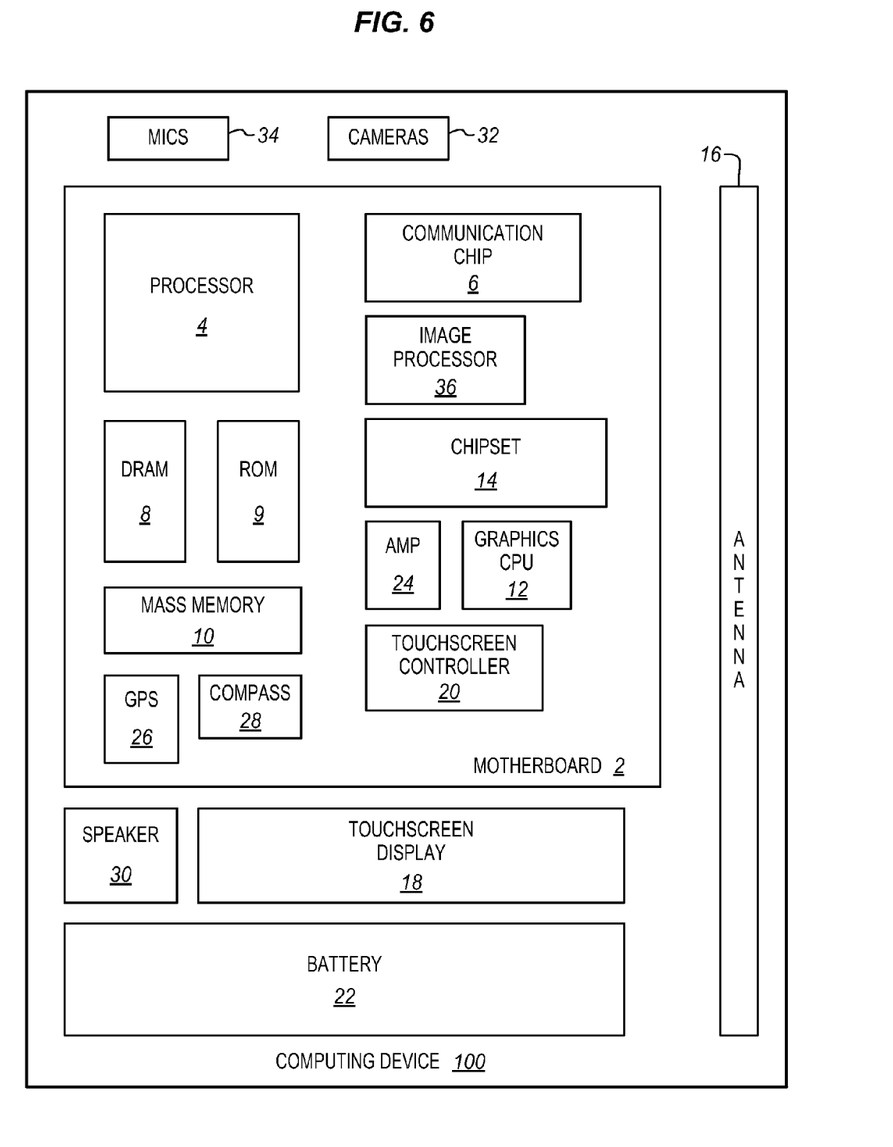
FIG. 6 is a block diagram of a computing device incorporating IR camera enhancements according to an embodiment.

FIG. 6 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 including any depth sensors or proximity sensor are coupled to an optional image processor 36 to perform conversions, analysis, noise reduction, comparisons, depth or distance analysis, image understanding and other processes as described herein. The processor 4 is coupled to the image processor to drive the process with interrupts, set parameters, and control operations of image processor and the cameras. Image processing may instead be performed in the processor 4, the cameras 32 or in any other device.

In various implementations, the computing device 100 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to an apparatus that includes a first image sensor to detect the luminance of a scene, a second image sensor to detect the visible light chrominance of the scene and to detect an infrared image of the scene, and an image processor to receive the luminance from the first image sensor and the chrominance from the second sensor to generate a visible light image of the scene, the image processor to further receive the infrared image from the second image sensor and to extract the infrared image from the visible light chrominance of the scene.

In further embodiments the first image sensor and the second image sensor have the same number of pixels.

In further embodiments the first image sensor measures visible light of all colors at each pixel.

In further embodiments the first image sensor is a monochrome sensor.

Further embodiments include an infrared light cut off filter between the first image sensor and the scene.

In further embodiments the second image sensor has an equal number or red, green, blue, and infrared pixels for example rows of alternating red and green and rows of alternating blue and infrared.

Further embodiments include a filter between the second image sensor and the scene with a narrow infrared passband filter centered for example at 850 nm.

In further embodiments the visible light image generated by the image processor has one of an RGB, JPEG, or YCrCb format.

In further embodiments the image processor is further to determine a disparity between the luminance and the chrominance of the scene and to compensate for the disparity before generating a visible light image of the scene.

Further embodiments include a memory to store infrared face recognition images and a processor to receive the infrared image and perform face recognition using the received image.

Further embodiments include an infrared LED to illuminate the scene while the second image sensor detects the infrared image of the scene.

Some embodiments pertain to a video conferencing node that includes a microphone to receive local audio, a speaker to render remote audio, a display to render remote video, a communications interface to send and receive audio and video with other video conferencing nodes, a first image sensor to detect the luminance of a local scene, a second image sensor to detect the visible light chrominance of the local scene and to detect an infrared image of the scene, and an image processor to receive the luminance from the first image sensor and the chrominance from the second sensor to generate visible light video of the local scene, the image processor to further receive the infrared image from the second image sensor and to extract the infrared image from the visible light chrominance of the scene.

In further embodiments the first image sensor has a plurality of complementary metal oxide semiconductor pixels and measures visible light of all colors at each pixel.

Further embodiments include a filter between the second image sensor and the scene with a narrow infrared passband filter and wherein the second image sensor has an equal number or red, green, blue, and infrared pixels.

Further embodiments include a memory to store infrared face recognition images and a processor to receive the infrared image and perform face recognition using the received image.

Further embodiments include an infrared LED to illuminate the scene while the second image sensor detects the infrared image of the scene.

Some embodiments pertain to a method that includes detecting the luminance of a scene with a first image sensor, detecting the visible light chrominance of the scene with a second image sensor, detecting an infrared image of the scene with the second image sensor, receiving the luminance from the first image sensor and the chrominance from the second sensor and generating a visible light image of the scene, and receiving the infrared image from the second image sensor and extracting the infrared image from the visible light chrominance of the scene.

In further embodiments detecting the chrominance and the infrared comprises filter light from the scene to remove infrared light except for a narrow infrared passband and simultaneously receiving visible and infrared light at the second image sensor at red, green, blue, and infrared pixels of the second image sensor.

Further embodiments include determining a disparity between the luminance and the chrominance of the scene and to compensate for the disparity before generating a visible light image of the scene.

Further embodiments include receiving the infrared image and performing face recognition using the received image by comparing the received infrared image with stored infrared face recognition images.

What is claimed is:

1. An apparatus comprising:
   a first image sensor to detect first image data of a scene, the first image data comprising luminance pixels of a visible monochromatic spectrum of the scene;
   a second image sensor to detect second image data of the scene, the second image data comprising visible light color pixels of the scene and infrared image pixels of the scene, wherein the visible light color pixels are converted into visible light chrominance pixels; and
   an image processor to receive the first image sensor luminance pixels and the second image sensor visible light chrominance pixels,
   wherein the image processor is to combine the first image sensor luminance pixels of the scene and the second image sensor visible light chrominance pixels of the scene, wherein the first image sensor luminance pixels are correlated with the second image sensor visible light chrominance pixels, wherein the image processor is to generate a visible light image of the scene comprising the first image sensor luminance pixels and the second image sensor visible light chrominance pixels to send to a display, and wherein the second image sensor infrared image pixels of the scene are separated from the second image sensor visible light chrominance pixels of the scene to generate an infrared image for a user log-in.

2. The apparatus of claim 1, wherein the first image sensor and the second image sensor have the same number of pixels.

3. The apparatus of claim 2, wherein the first image sensor measures visible light of all colors at each pixel.

4. The apparatus of claim 1, further comprising an infrared light cut off filter between the first image sensor and the scene.

5. The apparatus of claim 2, wherein the second image sensor has an equal number or red, green, blue, and infrared pixels.

6. The apparatus of claim 1, further comprising a filter between the second image sensor and the scene with a narrow infrared passband filter centered at 850 nm.

7. The apparatus of claim 1, wherein the visible light image generated by the image processor has one of an RGB, JPEG, or YCrCb format.

8. The apparatus of claim 1, wherein the image processor is further to determine a disparity between the first image sensor luminance pixels and the second image sensor chrominance pixels of the scene and to compensate for the disparity before generating the visible light image of the scene.

9. The apparatus of claim 1, further comprising a memory to store infrared face recognition images and a processor to receive the infrared image pixels and perform face recognition using the received infrared image pixels and the stored infrared face recognition images.

10. The apparatus of claim 9, further comprising an infrared LED to illuminate the scene while the second image sensor detects the infrared image pixels of the scene.

11. A video conferencing node comprising:
    a microphone to receive local audio;
    a speaker to render remote audio;
    a display to render remote video;
    a communications interface to send and receive audio and video with other video conferencing nodes;
    a first image sensor to detect first image data of a local scene, the first image data comprising luminance pixels of a visible monochromatic spectrum of the local scene;
    a second image sensor to detect second image data of the local scene, the second image data comprising visible light color pixels of the local scene and infrared image pixels of the local scene, wherein the visible light color pixels are converted into visible light chrominance pixels; and
    an image processor to receive the first image sensor luminance pixels and the second image sensor visible light chrominance pixels, wherein the image processor is to combine the first image sensor luminance pixels of the scene and the second image sensor visible light chrominance pixels of the scene, wherein the first image sensor luminance pixels are correlated with the second image sensor visible light chrominance pixels, wherein the image processor is to generate a visible light video of the local scene comprising the first image sensor luminance pixels and the second image sensor visible light chrominance pixels to send to a display, and wherein the second image sensor infrared image pixels of the scene are separated from the second image sensor visible light chrominance pixels of the scene to generate an infrared image for a user log-in.

12. The video conferencing node of claim 11, wherein the first image sensor has a plurality of complementary metal oxide semiconductor pixels and measures visible light of all colors at each pixel of the plurality of complementary metal oxide semiconductor pixels to generate the luminance pixels.

13. The video conferencing node of claim 11, further comprising a filter between the second image sensor and the scene with a narrow infrared passband filter and wherein the second image sensor has an equal number of red, green, blue, and infrared pixels.

14. The video conferencing node of claim 11, further comprising a memory to store infrared face recognition images and a processor to receive the infrared image pixels and perform face recognition using the received infrared image pixels and the stored infrared face recognition images.

15. The video conferencing node of claim 14, further comprising an infrared LED to illuminate the scene while the second image sensor detects the infrared image pixels of the scene.

16. A method comprising:
    detecting first image data of a scene using a first image sensor, the first image data comprising luminance pixels of a visible monochromatic spectrum of the scene;

detecting second image data of the scene using a second image sensor, the second image data comprising visible light color pixels of the scene and infrared image pixels of the scene, wherein the visible light color pixels are converted into visible light chrominance pixels;

receiving the first image sensor luminance pixels and the second sensor visible light chrominance pixels;

combining the first image sensor luminance pixels of the scene and the second image sensor visible light chrominance pixels of the scene;

correlating the first image sensor luminance pixels with the second image sensor visible light chrominance pixels; and generating a visible light image of the scene comprising the first image sensor luminance pixels and the second image sensor visible light chrominance pixels to send to a display, wherein the second image sensor infrared image pixels of the scene are separated from the second image sensor visible light chrominance pixels of the scene to generate an infrared image for a user log-in.

17. The method of claim 16, wherein detecting the visible light color pixels and the infrared image pixels comprises filtering light from the scene to remove infrared light except for a narrow infrared passband and simultaneously receiving visible and infrared light at the second image sensor at red, green, blue, and infrared pixels of the second image sensor.

18. The method of claim 16, further comprising determining a disparity between the first image sensor luminance pixels and the second image sensor chrominance pixels of the scene and compensating for the disparity before generating the visible light image of the scene.

19. The method of claim 16, further comprising receiving the second image sensor infrared image pixels and performing face recognition using the received infrared image pixels by comparing the received infrared image pixels with stored infrared face recognition images.

* * * * *